United States Patent [19]
Aufermann et al.

[11] Patent Number: 5,892,195
[45] Date of Patent: *Apr. 6, 1999

[54] ARC-RESISTANT SWITCHGEAR ENCLOSURE WITH ARCING CHAMBER VENTING STRUCTURE

[75] Inventors: Albert H. Aufermann, Ratingen, Germany; Robert S. Karnbach, Lake Mary, Fla.

[73] Assignee: ABB Power T&D Company, Inc., Raleigh, N.C.

[ * ] Notice: The term of this patent shall not extend beyond the expiration date of Pat. No. 5,689,097.

[21] Appl. No.: 900,422

[22] Filed: Jul. 25, 1997

Related U.S. Application Data

[63] Continuation of Ser. No. 538,448, Oct. 3, 1995, Pat. No. 5,689,097.

[51] Int. Cl.⁶ .............................. H01H 9/52; H02B 1/00; H02B 13/025; H05K 7/20
[52] U.S. Cl. .......................... 218/157; 361/676; 361/678
[58] Field of Search ................................... 200/289, 306, 200/50.21–50.27; 218/155–158; 361/600, 605–621, 676–678, 688, 690

[56] References Cited

U.S. PATENT DOCUMENTS

| | | | |
|---|---|---|---|
| 4,118,755 | 10/1978 | Davies et al. | 361/678 |
| 4,464,703 | 8/1984 | Davies et al. | 200/50.23 |
| 4,528,614 | 7/1985 | Shariff et al. | 361/678 |
| 5,124,881 | 6/1992 | Motoki | 361/605 |
| 5,193,049 | 3/1993 | Jackson | 361/676 |
| 5,457,296 | 10/1995 | Neill et al. | 200/306 |
| 5,574,624 | 11/1996 | Rennie et al. | 361/676 |

FOREIGN PATENT DOCUMENTS

| | | | |
|---|---|---|---|
| 1048626 | 1/1959 | Germany . | |
| 11 23 734 B | 2/1962 | Germany . | |
| 1188170 | 3/1975 | Germany . | |
| 3013756 | 10/1981 | Germany | H02B 1/08 |
| 54-003241A | 11/1979 | Japan . | |
| WO 91/03089 | 3/1991 | WIPO . | |

OTHER PUBLICATIONS

Edward W. Kalkstein et al., "The Safety Benefits of Arc Resistant Metalclad Medium Voltage Switchgear", 94–CH3451–2/94/0000–0309, 1994 IEEE.

"Procedure for Testing the Resistance of Metalclad Switchgear Under Conditions of Arcing Due to Conditions of Internal Fault", EEMAC Standard G14–1, 1987.

Paul Thompson et al., "Improved Switchgear Safety Through Arc–Resistant Construction," 1994 Electric Utility Conference.

*Primary Examiner*—J. R. Scott
*Attorney, Agent, or Firm*—Woodcock Washburn Kurtz Mackiewicz & Norris, LLP

[57] ABSTRACT

An improved arc-resistant switchgear enclosure is disclosed. The disclosed arc-resistant switchgear enclosure provides a cost effective structure to collect and channel the pressure and hot exhaust gases from lower compartments and safely vent these gases through the switchgear enclosure. In preferred embodiments, an internal arc chamber is formed by assembling modules and creating a void within the center of the switchgear enclosure. As multiple compartments or modules for a switchgear enclosure are connected, an arc chamber is created within the enclosure. Upon initiation of an arc fault within a particular compartment, a relief flap or cover for that particular compartment opens to channel the pressure and the gases into the internal arc chamber or directly through the top of the enclosure. Pressure and gases are vented into the internal arc chamber and flow horizontally through the arc chamber until a path to the top of the switchgear enclosure is reached. These, pressures and hot gases are then channeled upward and safely out of the switchgear enclosure. Also disclosed is a ventilation system for an arc-resistant switchgear enclosure that provides natural ventilation while preventing any arc gases from entering the lower, ventilated compartment(s), and that permits proper venting of pressure arc gases if originated in the ventilated compartment(s).

13 Claims, 5 Drawing Sheets

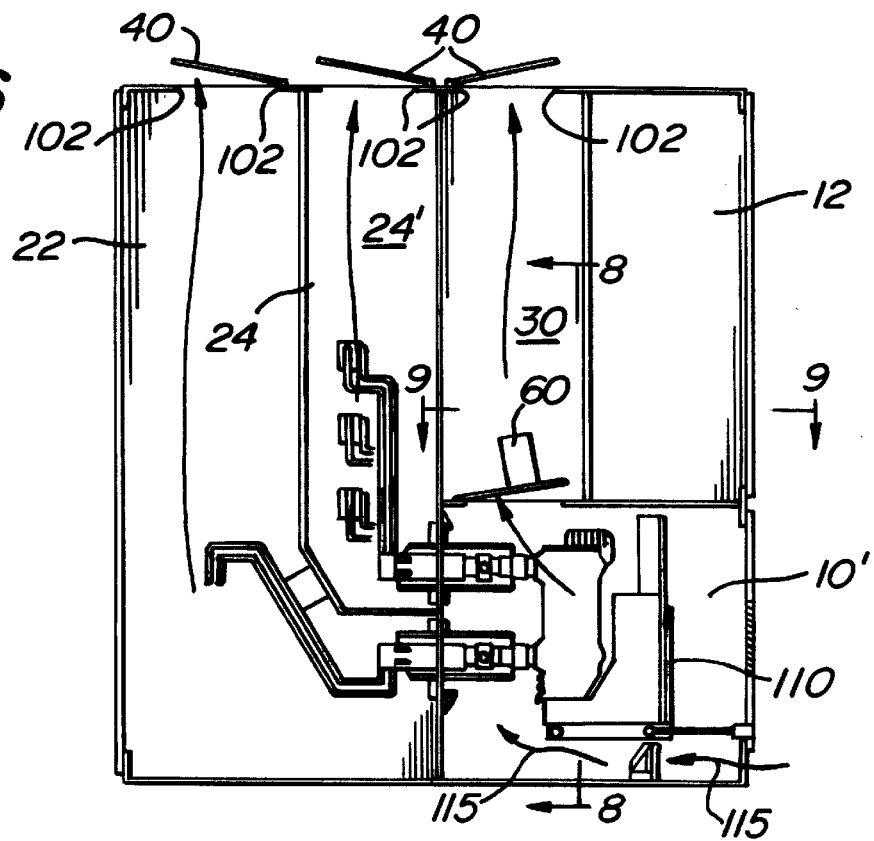
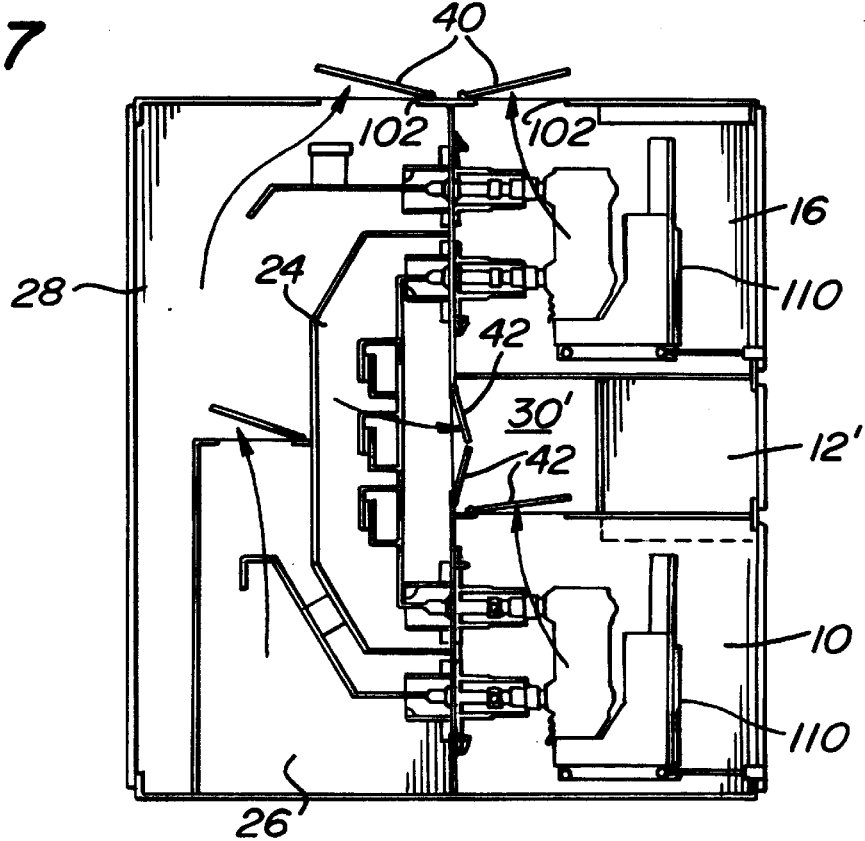

ARC-RESISTANT SWITCHGEAR ENCLOSURE WITH ARCING CHAMBER VENTING STRUCTURE

This is a continuation, of application Ser. No. 08/538,448, filed Oct. 3. 1995, now U.S. Pat. No. 5,689,097 the disclosure of which is herein incorporated by reference.

FIELD OF THE INVENTION

The present invention relates generally to the field of electrical power distribution equipment, such as medium voltage switchgear, and more particularly to an arc-resistant enclosure for housing medium voltage switchgear.

BACKGROUND OF THE INVENTION

Arc-resistant switchgear enclosures must be designed to withstand the pressures and temperatures of gases associated with an internal arcing fault. Such enclosures are designed to direct pressure and hot arc gases away from personnel and to thereby enhance safety. Prior to the present invention, the most commonly employed method of improving switchgear safety through arc-resistant construction was to provide a direct, vertical exhaust vent from each compartment to the top of the switchgear enclosure. A problem with this practice is that it precludes the use of vertically stacked arrangements (e.g., 2-high breaker enclosures, 1-high breaker with voltage transformer drawers, etc.), which are commonly employed in the North American switchgear market. This limitation, i.e., the preclusion of the use of vertically stacked arrangements, limits the commercial acceptance of existing arc-resistant construction in the United States.

Other prior art switchgear designs have employed external arc chambers. A problem with external arc chambers is that they limit the number and type of the switchgear configurations that may be deployed within a given volume.

Furthermore, certain classes of arc-resistant switchgear also require that the pressure and hot arc gases not enter any adjacent enclosures. This provides a problem for ventilating lower mounted compartments of higher ratings, since there may be a requirement for a natural air circulation ventilation path while preventing any pressure and arc gases from entering these ventilated compartments. Typically, any such ventilation system must also allow for proper venting of arc gases if originated in the ventilated compartment.

Further background information relating to the present invention can be found in the following publications:

"The Safety Benefits of Arc Resistant Metalclad Medium Voltage Switchgear," 94-CH3451-2/94/0000-0309, 1994 IEEE;

"Procedure for Testing the Resistance of Metalclad Switchgear Under Conditions of Arcing Due to Conditions of Internal Fault," EEMAC Standard G14-1, 1987 (this is the test standard used in North America; ANSI does not presently address this issue, although an ANSI working committee has been established); and "Improved Switchgear Safety Through Arc-Resistant Construction," by Paul Thompson and E. John Saleeby, 1994 (presented at the 1994 Electric Utility Conference).

SUMMARY OF THE INVENTION

Accordingly, an object of the present invention is to provide an improved arc-resistant enclosure for switchgear. A more specific object of the present invention is to provide a cost effective means to collect and channel the pressure and the hot exhaust gases from lower compartments and safely channel these pressures and gases through the switchgear enclosure.

The present invention achieves these goals by employing, in preferred embodiments, a series of compartments or modules that are arranged in various configurations. In accordance with the invention, an internal arc chamber is formed by assembling the modules and creating a void within the center of the switchgear enclosure. As multiple compartments for a switchgear enclosure are connected or assembled, an internal arc chamber is created having horizontal and vertical sections within the switchgear enclosure. Upon initiation of an arc fault within a particular compartment, a cover or relief flap for that particular compartment will open, venting the gases into the internal arc chamber or directly through the top of the enclosure depending on the compartment's location. Pressure and gases which are channeled into the internal arc chamber flow through the arc chamber until a section of the arc chamber is reached within the switchgear enclosure that includes an exit path to the top of the enclosure. This pressure and the hot gases are then channeled through the exit path and safely out of the switchgear enclosure. The arrangement is such that pressure and hot gases produced within a compartment within which an electrical arc fault occurs are controllably released from the top of the switchgear enclosure and prevented from entering into a compartment in which an arc fault as not occurred.

In sum, the present invention employs an integrated internal arc chamber that contains and controls the heat and related forces, i.e., pressure created by the hot gases and other particles, associated with an internal arc fault in medium voltage and other types of switchgear. The invention minimizes the risk of injury to personnel in the vicinity of the switchgear enclosure.

Other features of the invention are described below.

BRIEF DESCRIPTION OF THE DRAWINGS

FIG. 6 is a diagrammatic cross-sectional view of still another switchgear enclosure configuration in accordance with the present invention which also illustrates a slot and flap ventilation system aspect of the preferred embodiment of the present invention;

FIG. 7 is a diagrammatic cross-sectional view of still another switchgear enclosure configuration in accordance with the present invention;

DETAILED DESCRIPTION OF PREFERRED EMBODIMENTS

The present invention provides an integrated internal arc chamber particularly suited for safely and controllably releasing pressure and hot arc gases from lower compartments of a switchgear enclosure. In presently preferred embodiments, this arc chamber comprises a horizontal component or section and a vertical component or section, and functions by directing pressure and hot gases produced within a compartment(s) by an electrical arc fault associated with an electrical component in the compartment(s) out a relief flap on the roof or top of the switchgear enclosure. In addition, a series of ventilation slots may be added to the arc-relief flap on the lower compartment(s) to direct ventilating air to the arc chamber. This ventilation system, including one or more louvered flaps, is depicted in FIGS. 6, 8, 9 and 10, and is discussed below following the discussion of the internal arc chamber, which is described next and depicted in FIGS. 1–7.

Figure 1:
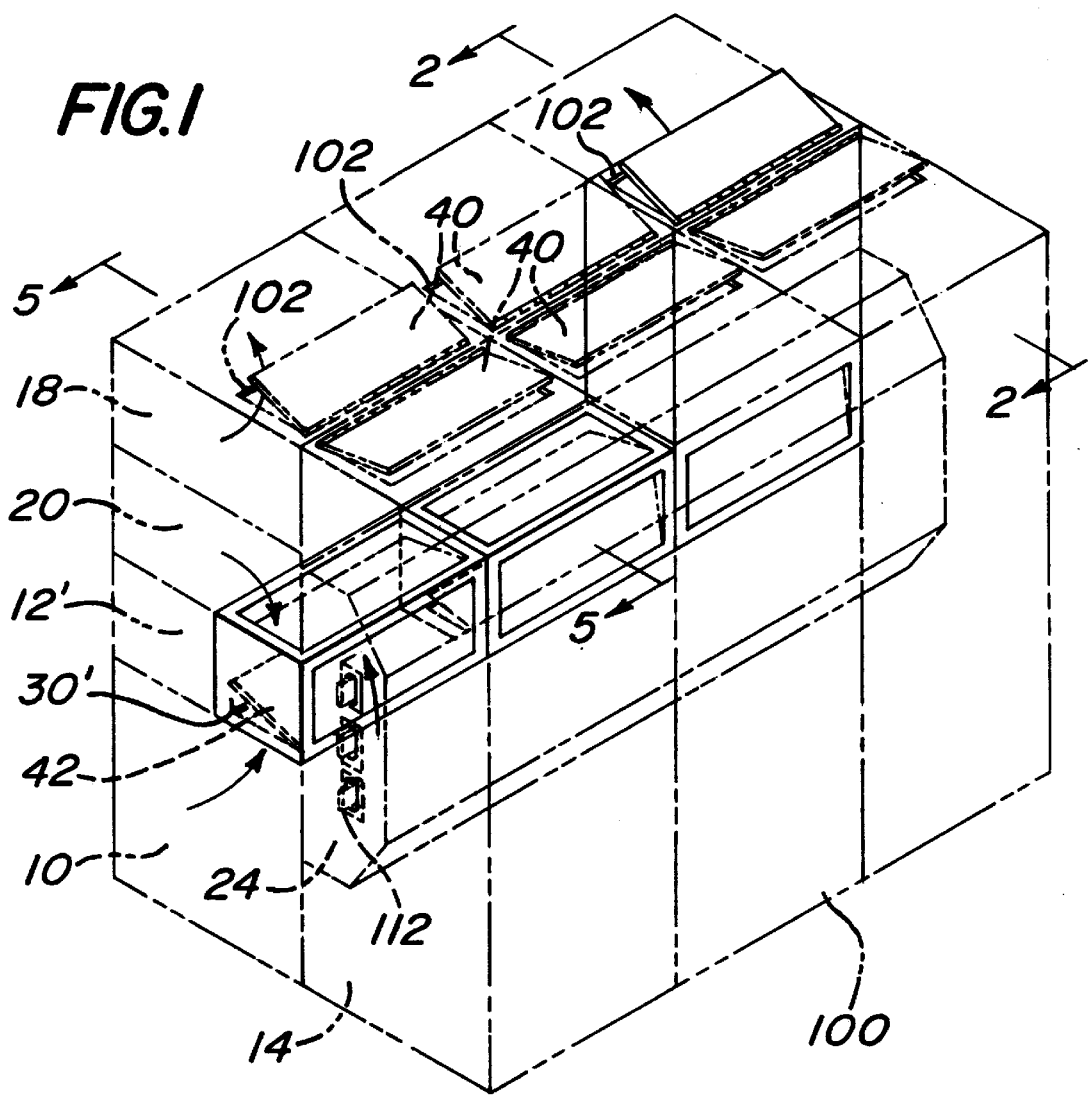
FIG. 1 is a diagrammatic isometric view of a switchgear enclosure containing an internal arc chamber in accordance with the present invention.
Figure 9:
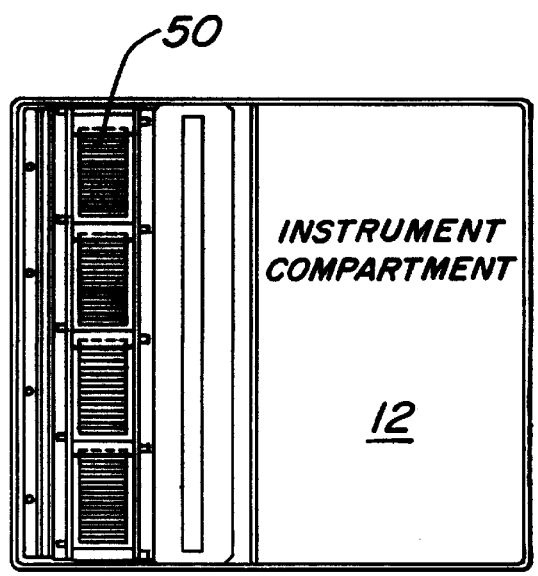
FIG. 9 is a diagrammatic cross-sectional view taken along the line 9—9 of FIG. 6.

Referring now to the drawings wherein like reference numerals refer to like parts throughout the several views, FIGS. 1–7 depict various arc-resistant metal-clad switchgear configurations in accordance with the present invention. FIG. 1 depicts a diagrammatic isometric view of a switchgear enclosure shown generally at 100. As can be seen from FIGS. 1 and 2, with FIG. 2, for example, depicting a cross-sectional view of a 1-high 1200A breaker configuration, a circuit breaker compartment 10 is positioned beneath a compartment 12 (FIG. 2) for low voltage equipment and adjacent to a cable compartment 14 and a bus compartment 24. A circuit breaker 110 is diagrammatically shown within compartment 10 and bus bars 112 are depicted inbus compartment 24. An arc chamber 30 is positioned as shown above the compartment 10 and to the right of compartment 24. Each of the compartments 10 and 24 have an aperture 102. The arc chamber 30 and hinged flaps 40, 42 permit pressure and arc gases to escape safely from any of the compartments 10 and 24, and to be vented through the roof or top of the enclosure 100. This permits the pressure and hot gases to be released without the risk of injury to personnel who might be working near the switchgear.

Figure 2:
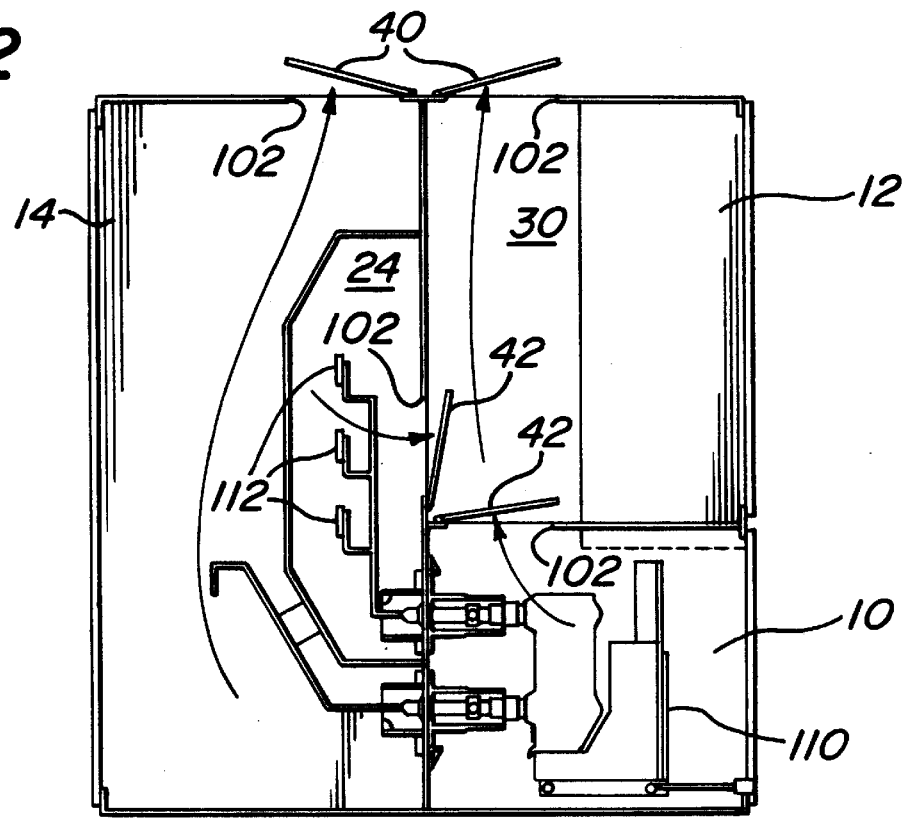
FIG. 2 is a diagrammatic cross-sectional view taken along the line 2—2 of FIG. 1.
Figure 3:
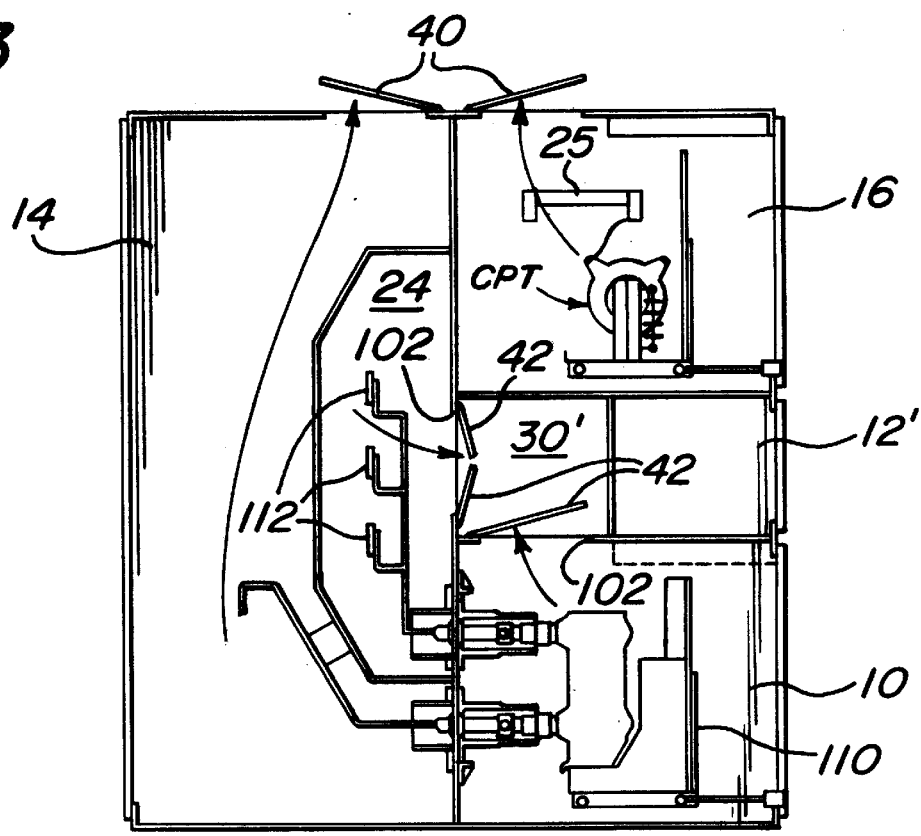
FIG. 3 is a diagrammatic cross-sectional view of a switchgear enclosure configuration in accordance with the present invention.

FIG. 3 depicts a cross-sectional view of a configuration including a 1200A breaker compartment 10 directly beneath a low voltage compartment 12' and an internal arc chamber 30'. In this configuration, the low voltage compartment 12' and internal arc chamber 30' have a shorter cross-section to provide room for a fused Control Power Transformer or CPT compartment 16. A fuse 25 is diagrammatically shown above the CPT. The arc chamber 30' includes a horizontal section and a vertical section vented through the roof of the enclosure. A vertical section can best be seen in FIG. 2.

Figure 4:
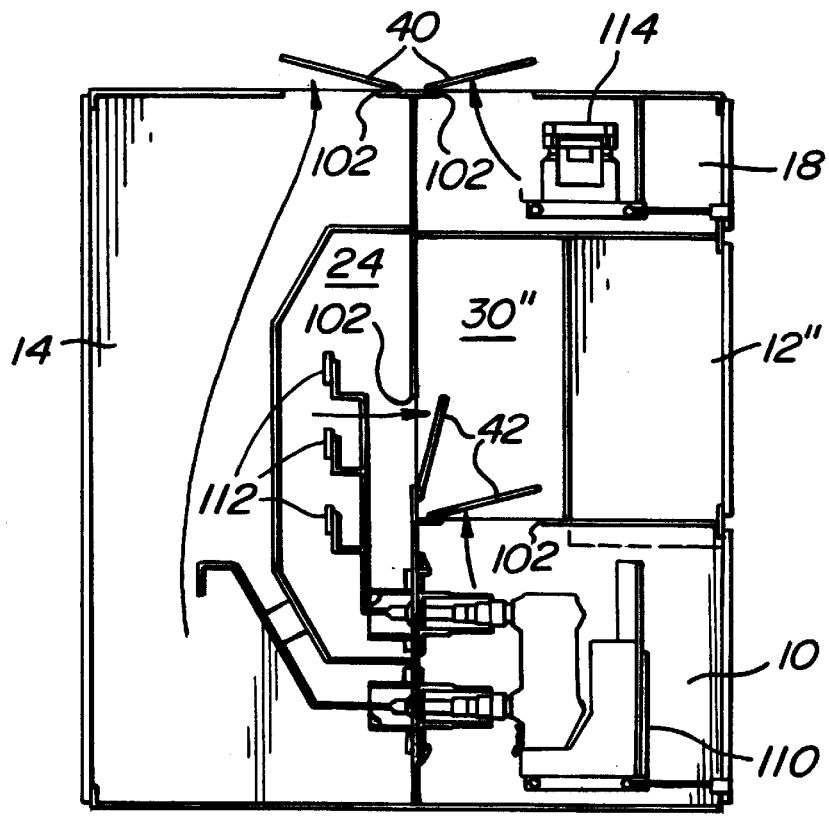
FIG. 4 is a diagrammatic cross-sectional view of another switchgear enclosure configuration in accordance with the present invention.
Figure 5:
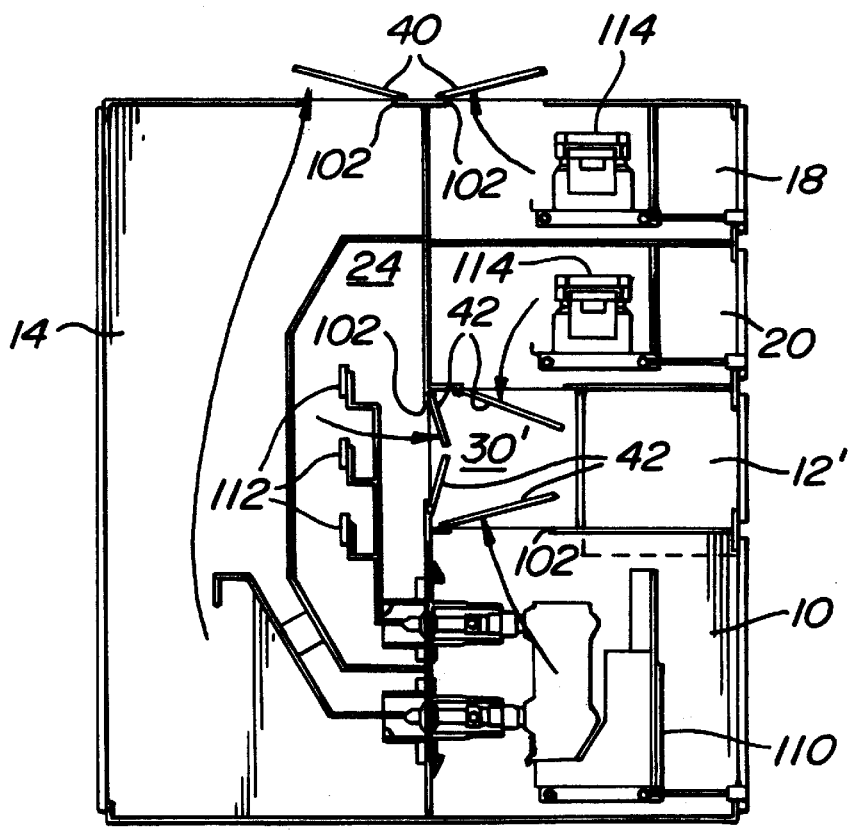
FIG. 5 is a diagrammatic cross-sectional view taken along the line 5—5 of FIG. 1.
Figure 8:
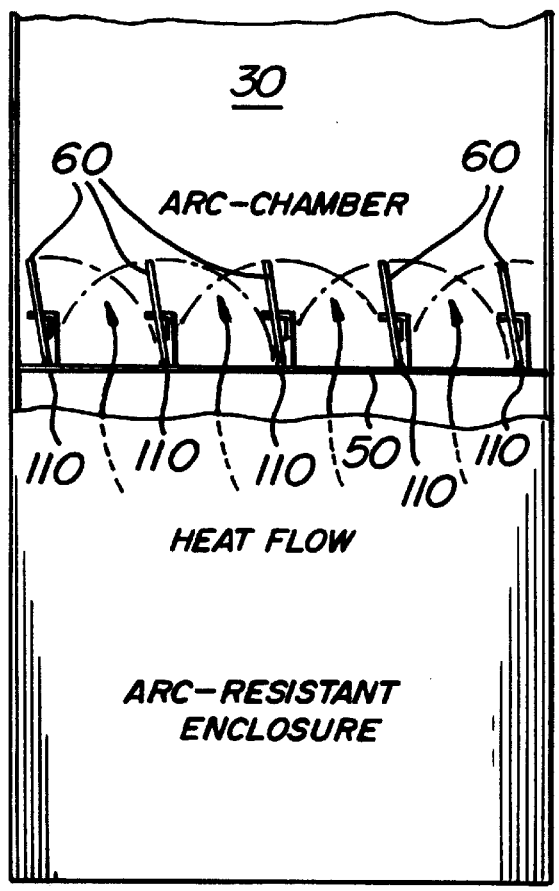
FIG. 8 is a diagrammatic cross-sectional view taken along the line 8—8 of FIG. 6.
Figure 10:
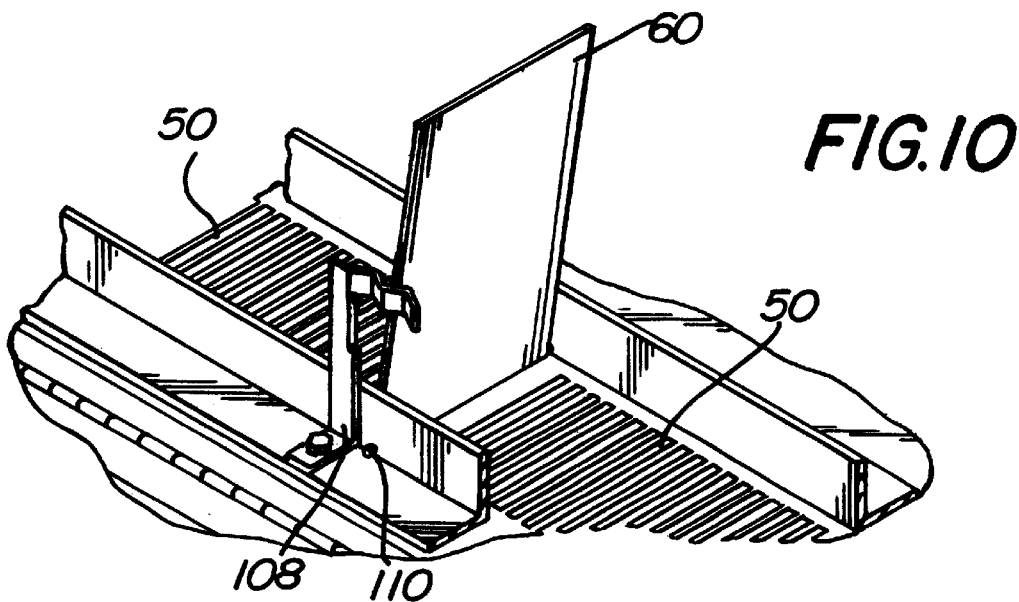
FIG. 10 is a diagrammatic isometric view of the slot and flap ventilation system depicted in FIG. 6.

The configurations depicted in FIGS. 3, 4, 6 and 7 are similar to those of FIGS. 1, 2 and 5. FIG. 4 depicts a cross-sectional view of a 1200A breaker compartment with a single voltage transformer unit configuration, including a low voltage compartment 12" and internal arc chamber 30" of intermediate height, and a voltage transformer compartment 18. A voltage or potential transformer 114 is diagrammatically shown within compartment 18. FIG. 5 depicts a configuration including a 1200A breaker compartment 10 and two voltage transformer compartments 18, 20; FIG. 6 depicts a cross-sectional view of a 1-high 2000A/3000A configuration including louvered vents or slots 50 (best seen in FIG. 10); and FIG. 7 depicts a cross-sectional view of a 2-high 1200A configuration.

In a specific implementation of the invention, all of the various modules are 36" wide and either 19", 38" or 57" high. The depth of the various switchgear modules is typically 40" and, to accommodate the internal arc chamber 30, 30', 30", as shown, the depth of the low voltage modules is about half of the depth of the other modules. The various configurations also include one or more external flaps 40 for venting the pressure and the hot gases produced when an internal arc occurs. Internal flaps 42 are also provided to permit such hot gases to escape from the internal compartments to the internal arc chamber 30. In the configurations in which the internal arc chamber 30' does not have a direct-path to the roof or top of the switchgear enclosure 100 (such as those depicted in FIGS. 3, 4, 5 and 7), the internal arc chamber includes a portion (a horizontal section) beneath one of the compartments communicating with a vertical section leading to the top or roof of the switchgear enclosure 100.

From the foregoing it will be understood by those skilled in the art that while the preferred embodiments of the invention have been describe above and illustrated in the various FIGS. as comprising a series of modular compartments arranged in various configurations and thereby forming an internal arc chamber as described, the internal arc chamber can also be constructed within an integrated frame design by bolting, welding or otherwise fastening sheet metal or other appropriate barrier materials within an integrated frame structure to form the internal arc chamber. The pressure relief flaps or covers 40 could be fashioned in like manner as a part of the integrated frame to permit hot gases to enter the internal arc chamber.

An essential aspect of the present invention is that the various compartments housing electrical components have apertures with covering means which cover the aperture of the compartment with which it is associated during both normal operation of an electrical component and when an arc fault occurs in a compartment with which it is not associated. Upon the occurrence of an arc fault within one or more of the compartments, the covering means uncovers the aperture of a compartment in which an arc fault occurs to permit pressure and gases to flow from a compartment in which an arc fault occurs into the arc chamber and flow through the arc chamber until a section of the arc chamber is reached within the switchgear enclosure that includes an exit path to the top of the switchgear enclosure whereby the pressure and gases are controllably released from the switch gear enclosure.

With reference to FIGS. 6, 8, 9 and 10, a ventilation system for ventilating lower mounted compartments, e.g., compartment 10' in FIG. 6, is provided so that a natural air circulation path is provided. As can be seen in FIG. 6, air can enter chamber 10' at its lowermost portion as depicted by the arrows 115. As mentioned above, a series or plurality of ventilation slots 50 may be added to the arc-relief flap or cover on the lower compartment(s) to permit normal convection cooling and to direct heated air out of the lower compartment(s) to the arc chamber. This aspect of the preferred embodiments is claimed in copending application Ser. No. 08/538,746; now U.S. Pat. No. 5,574,624 issued Nov. 12, 1996, titled "Ventilation System for Arc-Resistant Switchgear Enclosure," filed on even date herewith. As shown in FIGS. 6 and 8–10, a plurality of flat spring members 108 holds flaps 60 in a substantially vertical first position, the flaps 60 have a hinged pivot point 110 at the edge of the slots 50. The flaps 60 easily can free themselves from the light pressure exerted by spring members 108 to rapidly fall to a horizontal second position to close off the slots 50 in the event pressure and arc-gases, such as pressure and hot gases generated by an arc fault within another compartment, are present in the arc chamber. Since this slot and flap system can be added directly to the arc-relief flap of the lower compartment(s), over-pressure protection need not be impaired. In other words, the flaps 60 will automatically close when the pressure inside the internal arc chamber 30, 30', 30" increases due to an arc fault inside one of the other compartments.

The above description of preferred embodiments is not intended to limit the scope of protection of the following claims. Thus, for example, except where they are expressly so limited, the following claims are not limited to processes employing any particular number, configuration, or shape of switchgear compartments.

We claim:

1. An arc-resistant enclosure for electrical components comprising:

components for housing said electrical components; and an arc chamber communicating with plural ones of said compartments for releasing from said enclosure pressure and hot gases produced by an electrical arc fault associated with an electrical component in one of said compartments;

said arc chamber comprising:
   a first section providing an exit path from the enclosure; and
   a second section permitting a portion of said arc chamber to be situated beneath one of said compartments and above another of said compartments, said second section communicating with said first section whereby pressure and hot gases produced within a compartment within which an electrical arc fault occurs are controllably released from said enclosure via said arc chamber.

2. An arc-resistant enclosure as recited in claim 1 wherein each said compartments have an aperture for permitting pressure and gases to flow therefrom into said arc chamber, and further comprising covering means for each of said apertures.

3. An arc-resistant enclosure as recited in claim 2 wherein each said covering means,
   i) covers the aperture of the compartment with which it is associated during both normal operation and when an arc fault occurs in a compartment with which it is not associated; and
   ii) upon the occurrence of an arc fault within one or more of the compartments uncovers the aperture of a compartment in which an arc fault occurs to permit pressure and gases to flow from a compartment in which an arc fault occurs into said arc chamber.

4. An arc-resistant enclosure as recited in claim 2 wherein said covering means comprises a hinged flap.

5. An arc-resistant enclosure as recited in claim 1 wherein said electrical components are medium voltage switchgear components.

6. An arc-resistant enclosure as recited in claim 1 wherein said first section of said arc chamber is vertically disposed and said second section is horizontally disposed.

7. An arc-resistant enclosure as recited in claim 6 wherein said first section of said arc chamber has at least one aperture for permitting pressure and gases to flow therefrom and covering means for said at least one aperture.

8. An arc-resistant enclosure as recited in claim 1 wherein at least two of said compartments are stacked vertically.

9. An arc-resistant enclosure as recited in claim 2 wherein at least two of said compartments are stacked vertically; wherein said covering means comprises a hinged flap; and wherein said electrical components are medium voltage switchgear components.

10. An arc-resistant enclosure for electrical components comprising:

a plurality of compartments housing said electrical components, each of said compartments housing one or more of said electrical components, said plurality of compartments being arranged to form an arc chamber for providing a path for releasing from said enclosure pressure and hot gases produced by an electrical arc fault associated with an electrical component in a least one of said compartments;

plural ones of said compartments having an aperture permitting pressure and gases to flow therefrom into said arc chamber and having hinged covering means for each of said apertures;

said hinged covering means covering the aperture with which it is associated during both normal operation and when an arc fault occurs in a compartment with which it is not associated and, upon the occurrence of an arc fault within one or more of said compartments, uncovering the aperture of a compartment in which an arc fault occurs to permit pressure and gases to flow from a compartment in which an arc fault occurs into said arc chamber;

said arc chamber comprising a vertical section providing an exit path toward the top of said enclosure; and, a horizontal section permitting a portion of said arc chamber to be disposed beneath at least one of said compartments and above another of said compartments, said second section adjoining and communicating with said first section, the arrangement being such that pressure and hot gases produced within a compartment within which an electrical arc fault occurs are controllably released from said enclosure and prevented from entering into a compartment in which an arc fault has not occurred.

11. An arc-resistant enclosure as recited in claim 10 wherein at least two of said compartments are stacked vertically.

12. An arc-resistant enclosure as recited in claim 11 wherein said electrical components are switchgear components.

13. An arc-resistant enclosure as recited in claim 10 wherein at least two of said compartments are stacked vertically; wherein said hinged covering means are hinged flaps; and wherein said electrical components are switchgear components.

* * * * *